United States Patent Office 3,232,032
Patented Feb. 1, 1966

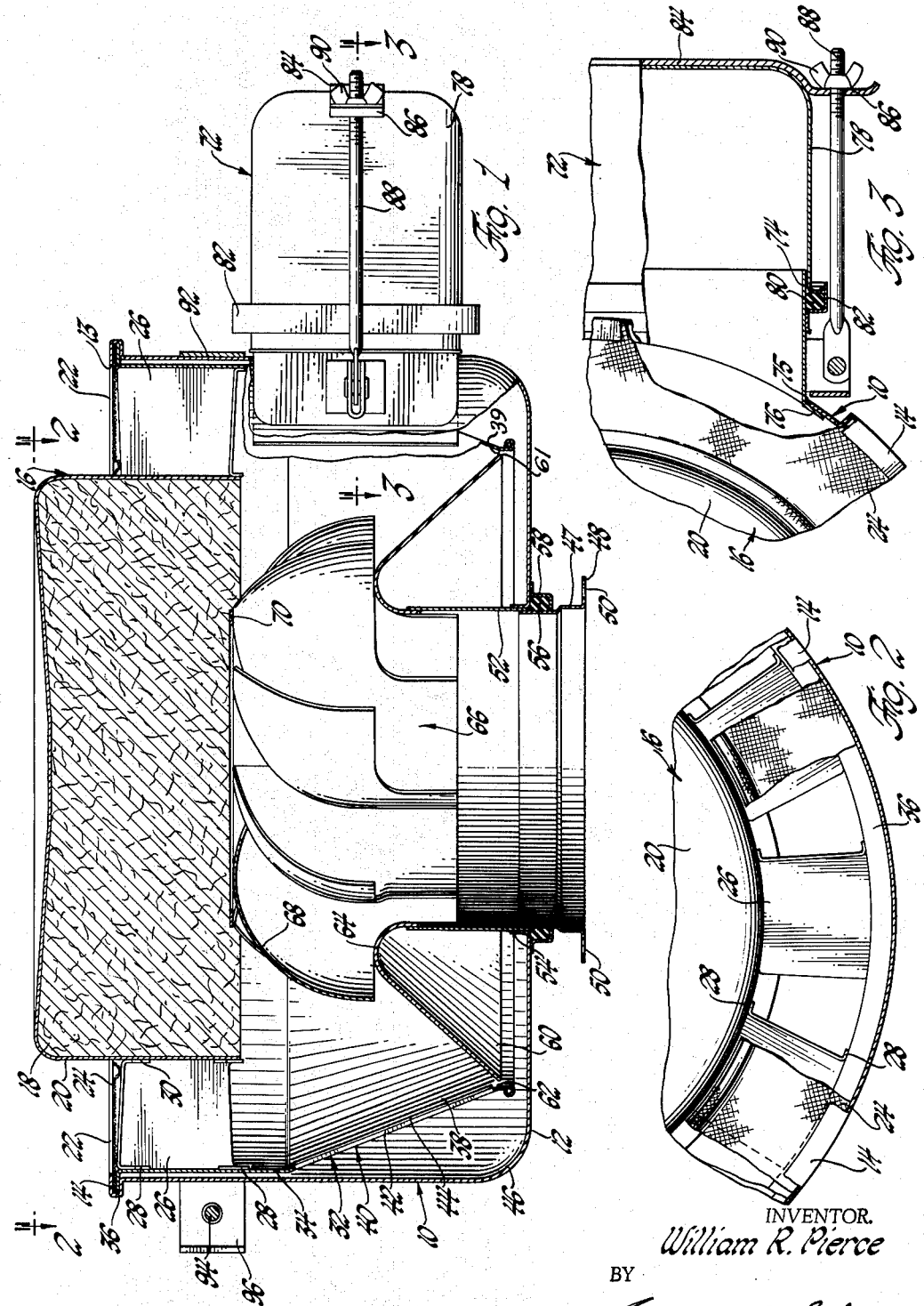

3,232,032
AIR CLEANER ASSEMBLY
William R. Pierce, Flint, Mich., assignor to General Motors Corporation, Detroit, Mich., a corporation of Delaware
Filed Apr. 5, 1962, Ser. No. 185,353
2 Claims. (Cl. 55—276)

This invention relates to air cleaner assemblies, and more particularly to a cyclone or swirl type air cleaner assembly adapted to be mounted on an internal combustion engine or the like.

In the design and manufacture of internal combustion engines and other such devices it is usual to provide an air cleaner assembly for removing impurities from the air passing to the induction system of the engine. Depending on the use to which the engine is to be put, some air cleaner assemblies are more efficient than others. In heavy earth moving equipment or engines operating in dry, arid regions, it is necessary to have a higher efficiency air cleaner due to the large amount of impurities in the atmosphere.

Devices that have been used in the past for cleaning incoming air to an internal combustion engine or the like have been generally cumbersome and complicated affairs when used under conditions as above described. Such devices comprise many pieces which are difficult to manufacture and assemble, and which are relatively low in efficiency.

The device in which this invention is embodied comprises, generally, an air cleaner assembly having a housing divided into two chambers by a conical member. One chamber may be defined as a swirl chamber which receives the incoming air and allows the air to swirl to permit the impurities to move to the outside under centrifugal force. The second chamber may be defined as a dust collection chamber and receives the impurities from the air that are separated by the centrifugal forces thereon. A plurality of deflectors or vanes are disposed in the inlet of the air cleaner assembly to impart the initial swirl to the incoming air. A second series of deflectors change the direction of the air and remove the swirl therefrom prior to passage into the induction system of the engine.

A device of this nature is relatively simple to manufacture and is assembled from a minimum number of pieces. The efficiency of such a device is extremely high when compared to other air cleaner assemblies and results in an economical and small sized device for use under extreme conditions.

These and other advantages will become more apparent from the following description and drawing, in which:

FIGURE 1 is a cross-sectional view of the air cleaner assembly illustrating the position of the various parts thereof;

FIGURE 2 is a portional plan view of the air cleaner assembly illustrated in FIGURE 1 with parts broken away and in section, and taken substantially along the line 2—2 of FIGURE 1 and looking in the direction of the arrows; and FIGURE 3 is a portional sectional view of the air cleaner illustrated in FIGURE 1, taken substantially along the line 3—3 of FIGURE 1 and looking in the direction of the arrows.

Referring more particularly to the drawing, FIGURE 1 best illustrates the overall air cleaner assembly. A sheet metal housing 10 is provided with a closed end portion 12 and an open end 13. A flange 14 surrounds open end 13 for purposes to be later described. Housing 10 may be of any cross-sectional configuration although it is preferred that the side walls be cylindrical.

Disposed centrally of the housing 10 and in the open end 13 is a silencer pad assembly, illustrated generally by the numeral 16. Assembly 16 includes a silencer pad 18 which may be formed of any suitable material, such as polyurethane foam or a fibrous material. Pad 18 is enclosed by a cover 20 which is supported in a manner to be later described. Cover 20 defines, with the housing 10, an annular inlet passage 22 which receives the incoming air which passes through the air cleaner assembly to the induction system of the engine or device with which the air cleaner assembly is employed. A screen 24 may be disposed in the inlet passage 22 in order to prevent large impurities, such as leaves, twigs and the like, from passing into the interior of the housing 10.

Disposed within the annular inlet passage 22 are a plurality of deflectors 26. Deflectors 26 are angularly disposed relative to the axis of the air cleaner assembly and are aligned to impart a swirl or rotary motion to the incoming air as it passes through the inlet 22. Deflectors 26 are provided with a plurality of flanges or lips 28 turned at substantially right angles relative to the body of the deflectors 26 for securing the deflectors in any suitable manner to the various sheet metal parts of the air cleaner assembly, such as to the silencer pad cover 20, as illustrated at 30.

Disposed below the inlet 22 and the deflectors 26 is a cone member, illustrated generally by the numeral 32. Cone member 32 includes an upper cylindrical portion 34 terminating in an outwardly bent flange 36. Flange 36 and screen 24 are secured in the housing 10 by means of the rolled or crimped flange 14 at the upper periphery of the housing 10. These parts are clamped in place within the flange 14 in any suitable manner. Extending downwardly from cylindrical section 34 of the cone member 32 and sloping inwardly from the external wall of housing 10 is a frusto-conical portion 38. The terminating edge 39 of frusto-conical portion 38 is in a plane spaced above end portion 12 and is spaced inwardly of the vertical outer wall of housing 10. Frusto-conical portion 38 serves to direct the swirling air and impurities downwardly and inwardly in the air cleaner assembly housing 10 and to provide a surface along which the impurities and dust particles may collect.

Cone member 32 may be provided with a plurality of skimmer slots and flanges, illustrated generally by the numeral 40. Skimmer means 40 includes a slot 42 formed axially along the conical surface of the cone portion 38. This may be done by stamping or otherwise cold-forming the sheet metal, and the material removed from the slot 42 is inwardly turned to provide a flange 44. As the air swirls within the cone member 32 heavier impurities and particles thrown to the surface of the cone portion 38 by centrifugal force are skimmed off by the flange 44 and slot 42 of the skimmer means 40. Thus, the flanges 44 open into the swirl chamber in a direction opposite to the direction of air flow. Impurities passing through the skimmer slots 42 are collected in the dust chamber 46 formed between the cone portion 38 and the housing 10.

Disposed in the lower wall or closed end 12 of the housing 10 is a tubular member 47 which has a mounting flange 48 suitable for securing the device to the induction system of an engine or other structure. Flange 48 may be provided with suitable bolt receiving apertures 50. Connected to closed end portion 12 of housing 10 is an upper tube member 52 which is secured to the closed end portion of the housing in any suitable manner, such as welding. Upper tube 52 is received in the aperture formed in the wall 12 and is secured to a suitable flange 54 formed in the wall 12. Gasket means 56 may be provided between the housing wall 12 and the tube members 47 and 52 if desired, and may be held in place by a sheet metal retainer 58. Gasket 56 forms a seal between mounting tube 47 and housing wall 12 and permits the mounting tube 47 to slide relative to the seal 56 and the housing. This provides for misalignment problems and permits axial movement when necessary during engine operation.

Upper tube 52 supports a conical baffle member 60 having an angularity opposite that of cone portion 38 of cone member 32. The edge of the base 61 of baffle 60 lies adjacent the lower apex 39 of cone 38 and provides an annular dust or impurities passage 62 communicating between the swirl chamber and the dust collection chamber 46. Baffle 60 serves a dual purpose, one being the above-described dust directing means and the second being to reverse the flow of air from a generally downward direction to a generally upward direction. This is accomplished by means of the air impinging on the conical section of baffle 60. Baffle 60 is provided with a curved annular portion 64 terminating in a suitable cylindrical section for attachment to upper tube 52. This may be accomplished in any suitable manner.

Also disposed in the upper tube 52 are a plurality of vanes, illustrated generally by the numeral 66. Vanes 66 are provided with spherical inner surfaces 68 and overlie the baffle 60 to provide air passages from the swirl chamber to the induction system of the engine. Spherical surfaces 68 serve to remove the swirl from the air as the air passes from the baffle 60, and also to change the direction of the air from a generally upward direction to an axial downward direction. Thus, the air passing through the outlet tubes 52 and 47 is directed axially downwardly for proper entry to the induction system. Vanes 66 are secured in the upper tube 52 in any suitable manner.

Located above the vanes 66 is an annular washer member 70 which partially supports the silencer pad assembly 16. The combination of washer 70 and deflector plates 26 support the silencer pad assembly in the proper position and manner.

At one side of housing 10 may be located a dust removal assembly, illustrated generally by the numeral 72. Dust removal assembly 72 includes a dust outlet tube 74 communicating with the dust chamber 46 through a suitable opening 75 in the side of housing 10. Tube 74 may be provided with a flange 76 adapted to overlie the housing 10 and be secured thereto in any suitable means. A cover member 78 is provided to engage the tube 74 adjacent gasket 80 and gasket retainer 82, as illustrated in FIGURE 3. Cover 78 is secured to the tube 74 by means of a retaining strap 84 terminating in bifurcated ends 86 which receive tie bolts 88 attached to the tube 74. Wing nuts 90 serve to tighten down strap 84 and secure the cover 78 in its proper position.

In order to properly mount the air cleaner assembly on the structure with which it is used, a mounting band 92 may be provided and a suitable bolt 94 received in a pair of ears 96 extending from the band 92.

The operation of the above-described construction is relatively simple. Incoming air is received through annular inlet 22 and a rotary motion or swirl is provided thereto by the deflector 26. The air is swirled in the swirl chamber causing dust and impurities to fly to the outside due to centrifugal force. Skimmer means 40 remove the larger and heavier impurities, and the remaining dust and impurities drop into the dust chamber 46 through the annular passage 62 formed between the cone member 32 and the baffle 60. Baffle 60 causes the air to reverse direction and travel upwardly into the vanes 66 which remove the swirl or rotary motion from the air and direct the air axially into the engine. Silencing pad 18 muffles the noise and roar of the circulating air to make the assembly generally quiet.

Thus, an air cleaner assembly is provided which is relatively simple in operation and comprises relatively few parts. Assembly is simple and the parts are properly secured together by known means. The air cleaner assembly is of high efficiency, particularly in areas where conditions are extreme and the air is heavily laden with impurities.

What is claimed is:
1. An air cleaner assembly comprising:
   a housing having an open end and a closed end and having a peripheral flange about said open end and a central aperture through said closed end;
   an outlet tube secured in said aperture in said closed end of said housing for conveying clean air out of said air cleaner assembly;
   a silencer pad disposed centrally in said open end and defining with said housing an annular inlet passage;
   a plurality of deflectors in said inlet passage angularly disposed to deflect incoming air and impart a swirl thereto;
   a frusto-conical member secured to said peripheral flange in said housing having a frusto-conical portion thereof sloping inwardly from the external wall of said housing toward said closed end of said housing, the edge of said sloped portion terminating on a plane spaced from said closed end within said housing;
   a plurality of skimmer flanges on said frusto-conical portion for removing larger impurities conveyed along the sloping portion thereof;
   a frusto-conical baffle secured to and supported by said outlet tube and sloping outwardly from said outlet tube toward said closed end of said housing and terminating adjacent the edge of said frusto-conical portion and defining an annular dust passage therewith;
   and a plurality of air deflector vanes centrally disposed in said housing overlying a portion of said frusto-conical baffle and being supported thereby and extending into said outlet tube, said vanes having a spherical shape and being adapted to remove the swirl from the air flowing thereto and change the direction of the air flow whereby the air flow is directed axially out of the air cleaner through the outlet tube and the tops of said air deflectors contacting and partially supporting said silencer pad.
2. The air cleaner assembly set forth in claim 1 and further including a dust removal assembly attached to said housing for removing dust and impurities removed from the air and deposited in the closed end of said housing.

References Cited by the Examiner
UNITED STATES PATENTS

| | | | |
|---|---|---|---|
| 1,434,563 | 11/1922 | Quam | 55—391 X |
| 1,438,553 | 12/1922 | Quam | 55—391 X |
| 1,464,741 | 8/1923 | Bennett. | |
| 1,496,908 | 6/1924 | Schutz. | |
| 1,556,592 | 10/1925 | Donaldson. | |

(Other references on following page)

UNITED STATES PATENTS

| | | | |
|---|---|---|---|
| 1,686,066 | 10/1928 | Boyrie | 55—410 X |
| 1,723,427 | 8/1929 | Kamrath | 55—416 |
| 1,742,564 | 1/1930 | Summers | 55—416 |
| 1,743,522 | 1/1930 | Bull | 55—276 |
| 1,723,427 | 8/1929 | Kamrath | 55—416 |
| 1,842,082 | 1/1932 | Edridge | 55—448 |
| 1,871,337 | 8/1932 | Moulding | 55—449 X |
| 1,922,316 | 8/1933 | Moulding et al. | 55—394 X |
| 1,934,311 | 11/1933 | Kegerreis et al. | 55—391 X |
| 1,952,740 | 3/1935 | Winslow. | |
| 2,067,160 | 1/1937 | Rensink | 55—276 X |
| 2,214,658 | 9/1940 | Browning. | |
| 2,229,332 | 10/1942 | Marshall | 55—447 |
| 2,480,379 | 8/1949 | Newberry | 55—448 X |
| 2,936,043 | 5/1960 | Armstrong et al. | 55—416 |
| 2,937,713 | 5/1960 | Stephension et al. | 55—394 X |

FOREIGN PATENTS

| | | |
|---|---|---|
| 460,336 | 5/1928 | Germany. |
| 926,647 | 4/1955 | Germany. |

HARRY B. THORNTON, *Primary Examiner.*

ROBERT F. BURNETT, *Examiner.*